United States Patent
Zheng et al.

(10) Patent No.: US 11,442,657 B1
(45) Date of Patent: Sep. 13, 2022

(54) ABNORMAL DATA MANAGEMENT METHOD, MEMORY STORAGE DEVICE, AND MEMORY CONTROL CIRCUIT UNIT

(71) Applicant: Hefei Core Storage Electronic Limited, Anhui Province (CN)

(72) Inventors: Yan Zheng, Anhui Province (CN); Zhi Wang, Anhui Province (CN); Kai-Di Zhu, Anhui Province (CN)

(73) Assignee: Hefei Core Storage Electronic Limited, Anhui (CN)

( * ) Notice: Subject to any disclaimer, the term of this patent is extended or adjusted under 35 U.S.C. 154(b) by 0 days.

(21) Appl. No.: 17/207,737

(22) Filed: Mar. 21, 2021

(30) Foreign Application Priority Data

Mar. 9, 2021 (CN) .......................... 202110254803.X (51) Int. Cl.
  *G06F 3/06* (2006.01)
(52) U.S. Cl.
  CPC .......... *G06F 3/0655* (2013.01); *G06F 3/0619* (2013.01); *G06F 3/0679* (2013.01)
(58) Field of Classification Search
  CPC ..... G06F 3/0619; G06F 3/0655; G06F 3/0679
  See application file for complete search history.

(56) References Cited

U.S. PATENT DOCUMENTS

| 8,661,193 B1 * | 2/2014 | Cobos ................ G11B 20/1889 711/155 |
| 9,524,236 B1 * | 12/2016 | Myung ............... G06F 12/0246 |
| 10,402,094 B2 | 9/2019 | Tiotantra et al. |
| 11,113,149 B2 * | 9/2021 | Kim ..................... G06F 11/0772 |

FOREIGN PATENT DOCUMENTS

| TW | 200931425 | 7/2009 |
| TW | 201227741 | 7/2012 |
| TW | 202009942 | 3/2020 |
| TW | I688956 | 3/2020 |
| TW | 202026884 | 7/2020 |
| TW | 202036295 | 10/2020 |
| WO | 2017012096 | 1/2017 |

* cited by examiner

*Primary Examiner* — Mark A Giardino, Jr.
(74) *Attorney, Agent, or Firm* — JCIPRNET (57) ABSTRACT

A memory management method, a memory storage device, and a memory control circuit unit are provided. The memory management method includes: storing first management information in a rewritable non-volatile memory module, wherein the first management information reflects a storage status of abnormal data in a first physical unit in the rewritable non-volatile memory module; receiving a read command from a host system, wherein the read command instructs to read data stored in a logical unit corresponding to a physical node in the first physical unit; inquiring the first management information according to the read command; transmitting data read from the physical node to the host system if an inquiring result reflects that the abnormal data is not stored in the physical node; and transmitting error information to the host system if the inquiring result reflects that the abnormal data is stored in the physical node.

18 Claims, 7 Drawing Sheets

ABNORMAL DATA MANAGEMENT METHOD, MEMORY STORAGE DEVICE, AND MEMORY CONTROL CIRCUIT UNIT

CROSS-REFERENCE TO RELATED APPLICATION

This application claims the priority benefit of China application serial no. 202110254803.X, filed on Mar. 9, 2021. The entirety of the above-mentioned patent application is hereby incorporated by reference herein and made a part of this specification.

BACKGROUND

Technical Field

The disclosure relates to a memory management technology, and particularly relates to a memory management method, a memory storage device, and a memory control circuit unit.

Description of Related Art

Digital cameras, mobile phones, and MP3 players have grown rapidly over the past few years, which has led to a rapid increase in consumer demand for storage media. Since the rewritable non-volatile memory module (for example, a flash memory) has characteristics such as non-volatile data, power saving, small size, and no mechanical structure, the rewritable non-volatile memory module is very suitable to be built into the various portable multimedia devices exemplified above.

Generally speaking, the memory storage device may store old data in the rewritable non-volatile memory module by a data consolidation operation (for example, a garbage collection procedure) and release a new spare physical unit. The new spare physical unit may be configured to store new data from the host system. However, during the data consolidation operation, if a certain old data moved belongs to uncorrectable data (for example, the data contains too many error bits to be corrected), the data will be regarded as normal data to be stored to a target physical unit. Later, when the host system instructs to read the data (which is actually uncorrectable data), the memory storage device will regard the data as the normal data to be read from the target physical unit and transmitted to the host system, thereby reducing the data quality of read data.

SUMMARY

The disclosure provides a memory management method, a memory storage device, and a memory control circuit unit, which can improve the data access quality of the memory storage device.

An exemplary embodiment of the disclosure provides a memory management method, which is applicable to a rewritable non-volatile memory module. The rewritable non-volatile memory module includes multiple physical units. The memory management method includes the following steps. First management information is stored in the rewritable non-volatile memory module. The first management information reflects a storage status of abnormal data in a first physical unit among the physical units. A read command is received from a host system. The read command instructs to read data stored in at least one logical unit, and the at least one logical unit corresponds to at least one physical node in the first physical unit. The first management information is inquired according to the read command. Data read from the at least one physical node is transmitted to the host system when an inquiring result reflects that the abnormal data is not stored in the at least one physical node. Error information is transmitted to the host system when the inquiring result reflects that the abnormal data is stored in the at least one physical node.

In an exemplary embodiment of the disclosure, the step of inquiring the first management information according to the read command includes the following steps. A storage address of the node management information in the rewritable non-volatile memory module is obtained according to the unit management information. The node management information is read from the storage address.

In an exemplary embodiment of the disclosure, the memory management method further includes the following steps. A data consolidation operation is executed to copy the data from a second physical unit among the physical units to the first physical unit before receiving the read command from the host system. The first management information is updated according to second management information. The second management information reflects a storage status of the abnormal data in the second physical unit.

In an exemplary embodiment of the disclosure, the memory management method further includes the following step. The second management information is reset after copying the data from the second physical unit to the first physical unit.

An exemplary embodiment of the disclosure further provides a memory storage device, which includes a connection interface unit, a rewritable non-volatile memory module, and a memory control circuit unit. The connection interface unit is configured to couple to a host system. The rewritable non-volatile memory module includes multiple physical units. The memory control circuit unit is coupled to the connection interface unit and the rewritable non-volatile memory module. The memory control circuit unit is configured to store first management information in the rewritable non-volatile memory module. The first management information reflects a storage status of abnormal data in a first physical unit among the physical units. The memory control circuit unit is further configured to receive a read command from the host system. The read command instructs to read data stored in at least one logical unit. The at least one logical unit corresponds to at least one physical node in the first physical unit. The memory control circuit unit is further configured to inquire the first management information according to the read command. The memory control circuit unit is further configured to transmit data read from the at least one physical node to the host system when an inquiring result reflects that the abnormal data is not stored in the at least one physical node. The memory control circuit unit is further configured to transmit error information to the host system when the inquiring result reflects that the abnormal data is stored in the at least one physical node.

In an exemplary embodiment of the disclosure, the memory control circuit unit is further configured to execute a data consolidation operation to copy the data from a second physical unit among the physical units to the first physical unit before receiving the read command from the host system. The memory management circuit is further configured to update the first management information according to second management information. The second management information reflects a storage status of the abnormal data in the second physical unit.

In an exemplary embodiment of the disclosure, the memory control circuit unit is further configured to reset the second management information after copying the data from the second physical unit to the first physical unit.

An exemplary embodiment of the disclosure further provides a memory control circuit unit, which is configured to control a rewritable non-volatile memory module. The rewritable non-volatile memory module includes multiple physical units. The memory control circuit unit includes a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit is configured to store first management information in the rewritable non-volatile memory module. The first management information reflects a storage status of abnormal data in a first physical unit among the physical units. The memory management circuit is further configured to receive a read command from the host system. The read command instructs to read data stored in at least one logical unit. The at least one logical unit corresponds to at least one physical node in the first physical unit. The memory management circuit is further configured to inquire the first management information according to the read command. The memory management circuit is further configured to transmit data read from the at least one physical node to the host system when an inquiring result reflects that the abnormal data is not stored in the at least one physical node. The memory management circuit is further configured to transmit error information to the host system when the inquiring result reflects that the abnormal data is stored in the at least one physical node.

In an exemplary embodiment of the disclosure, the abnormal data includes at least one of corrupted data and uncorrectable data.

In an exemplary embodiment of the disclosure, the first management information includes unit management information, which reflects whether the abnormal data is stored in the first physical unit.

In an exemplary embodiment of the disclosure, the first management information further includes node management information, which reflects whether the abnormal data is stored in the at least one physical node.

In an exemplary embodiment of the disclosure, the operation of inquiring the first management information according to the read command includes the following steps. A storage address of the node management information in the rewritable non-volatile memory module is obtained according to the unit management information. The node management information is read from the storage address.

In an exemplary embodiment of the disclosure, the memory management circuit is further configured to execute a data consolidation operation to copy the data from a second physical unit among the physical units to the first physical unit before receiving the read command from the host system. The memory management circuit is further configured to update the first management information according to second management information. The second management information reflects a storage status of the abnormal data in the second physical unit.

In an exemplary embodiment of the disclosure, the memory management circuit is further configured to reset the second management information after copying the data from the second physical unit to the first physical unit.

Based on the above, the first management information may be stored in the rewritable non-volatile memory module to reflect the storage status of the abnormal data in the first physical unit. After receiving the read command from the host system, the first management information may be inquired. According to the inquiring result, the data or the error information read from the at least one physical node in the first physical unit may be selectively transmitted to the host system. In this way, the data access quality of the memory storage device can be improved.

DETAILED DESCRIPTION OF DISCLOSED EMBODIMENTS

Generally speaking, a memory storage device (also referred to as a memory storage system) includes a rewritable non-volatile memory module and a controller (also referred to as a control circuit). Usually, the memory storage device is used together with a host system, so that the host system may write data to the memory storage device or read data from the memory storage device.

Figure 1:
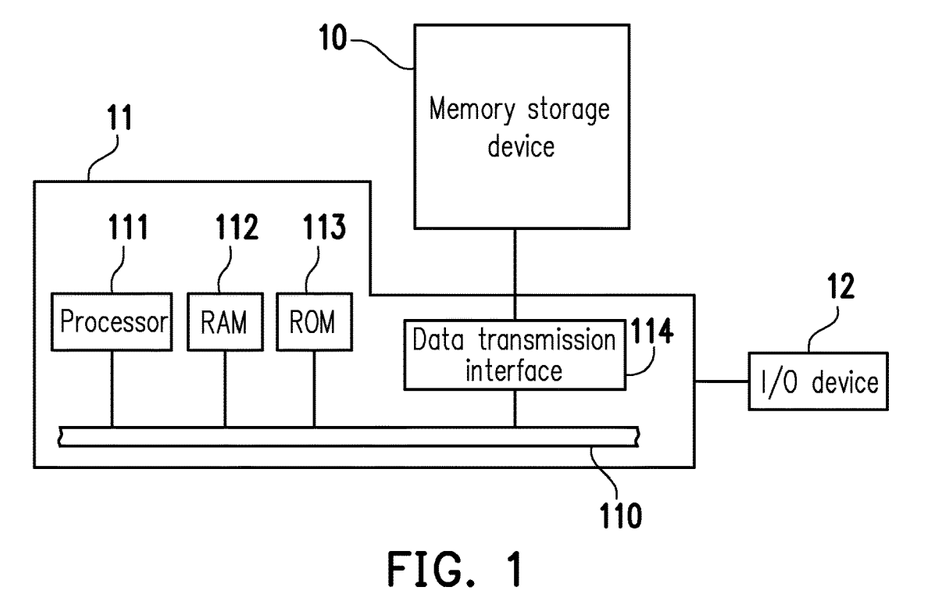
FIG. 1 is a schematic diagram of a host system, a memory storage device, and an input/output (I/O) device according to an exemplary embodiment of the disclosure.
Figure 2:
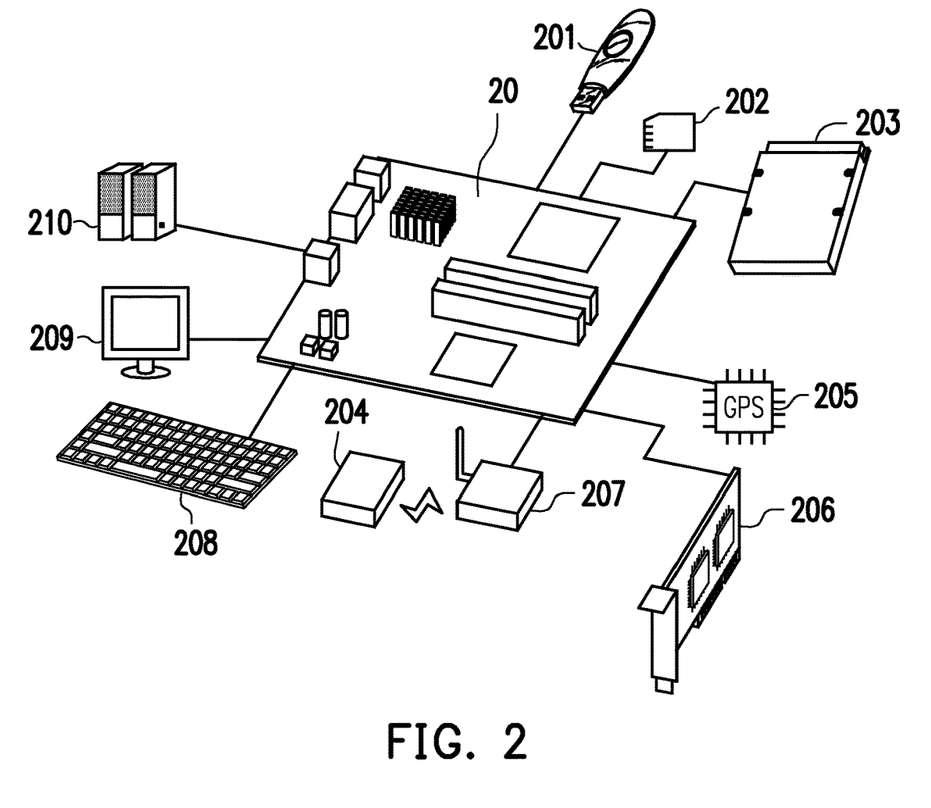
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 generally includes a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In this exemplary embodiment, the host system 11 is coupled to a memory storage device 10 through the data transmission interface 114. For example, the host system 11 may store data to the memory storage device 10 or read data from the memory storage device 10 via the data transmission interface 114. In addition, the host system 11 is coupled to an I/O device 12 through the system bus 110. For example, the host system 11 may transmit an output signal to the I/O device 12 or receive an input signal from the I/O device 12 via the system bus 110.

In this exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via wired or wireless means. The memory storage device 10 may, for example, be a flash drive 201, a memory card 202, a solid state drive (SSD) 203, or a wireless memory storage device 204. The wireless memory storage device 204 may, for example, be a near field communication (NFC) memory storage device, a wireless fax (WiFi) memory storage device, a Bluetooth memory storage device, a low power consumption Bluetooth memory storage device (for example, iBeacon), or other memory storage devices based on various wireless communication technologies. In addition, the motherboard 20 may also be coupled to various I/O devices such as a global positioning system (GPS) module 205, a network interface card 206, a wireless transmission device 207, a keyboard 208, a screen 209, and a speaker 210 through the system bus 110. For example, in an exemplary embodiment, the motherboard 20 may access the wireless memory storage device 204 through the wireless transmission device 207.

Figure 3:
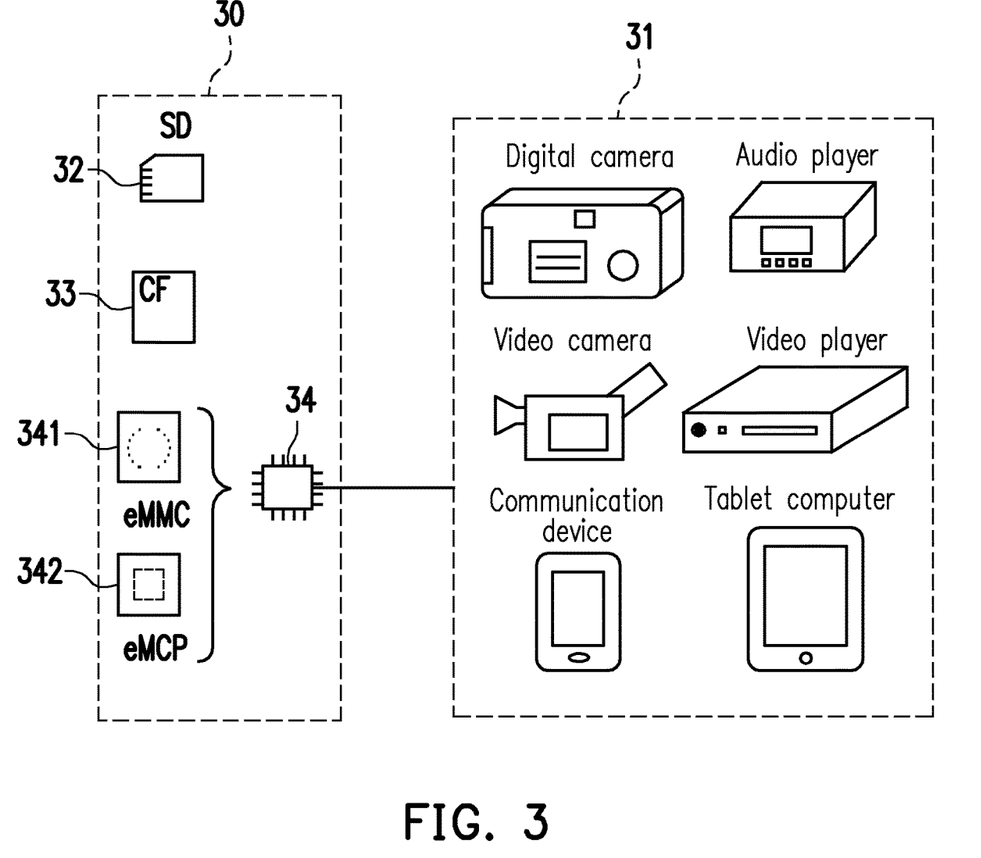
FIG. 3 is a schematic diagram of a host system and a memory storage device according to an exemplary embodiment of the disclosure.

In an exemplary embodiment, the host system is any system that may substantially cooperate with a memory storage device to store data. Although in the above exemplary embodiment, the host system is described as a computer system, FIG. 3 is a schematic diagram of a host system and a memory storage device according to an exemplary embodiment of the disclosure. Please refer to FIG. 3. In another exemplary embodiment, a host system 31 may also be a system such as a digital camera, a video camera, a communication device, an audio player, a video player, or a tablet computer, and a memory storage device 30 may be various non-volatile memory storage devices such as a secure digital (SD) card 32, a compact flash (CF) card 33, or an embedded storage device 34 used thereby. The embedded storage device 34 includes various embedded storage devices in which a memory module is directly coupled onto a substrate of a host system, such as an embedded multi media card (eMMC) 341 and/or an embedded multi chip package (eMCP) storage device 342.

Figure 4:
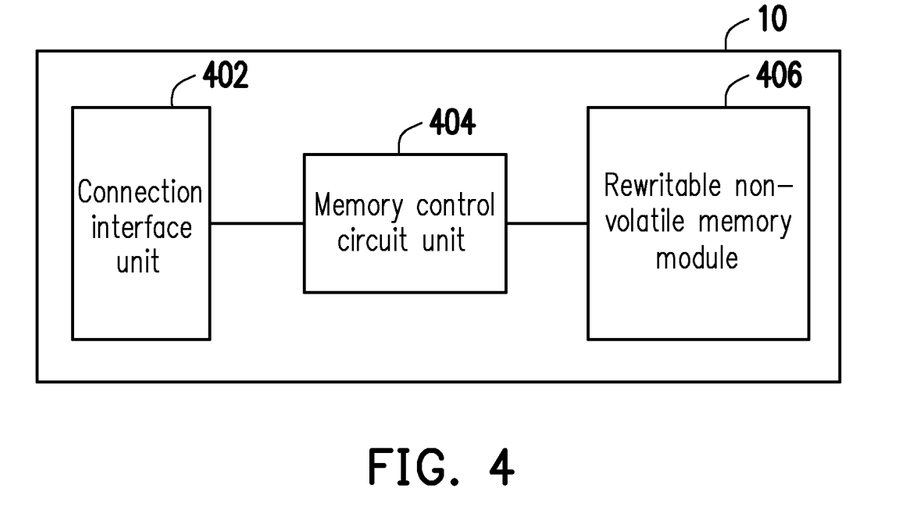
FIG. 4 is a schematic block diagram of a memory storage device according to an exemplary embodiment of the disclosure.

FIG. 4 is a schematic block diagram of a memory storage device according to an exemplary embodiment of the disclosure. Please refer to FIG. 4. The memory storage device 10 includes a connection interface unit 402, a memory control circuit unit 404, and a rewritable non-volatile memory module 406.

The connection interface unit 402 is configured to couple the memory storage device 10 to the host system 11. The memory storage device 10 may communicate with the host system 11 through the connection interface unit 402. In this exemplary embodiment, the connection interface unit 402 is compatible with the serial advanced technology attachment (SATA) standard. However, it must be understood that the disclosure is not limited thereto, and the connection interface unit 402 may also conform to the parallel advanced technology attachment (PATA) standard, the Institute of Electrical and Electronic Engineers (IEEE) 1394 standard, the peripheral component interconnect express (PCI express) standard, the universal serial bus (USB) standard, the SD interface standard, the ultra high speed-I (UHS-I) interface standard, the ultra high speed-II (UHS-II) interface standard, the memory stick (MS) interface standard, the multi chip package (MCP) interface standard, the multi media card (MMC) interface standard, the eMMC interface standard, the universal flash storage (UFS) interface standard, the eMCP interface standard, the CF interface standard, the integrated device electronics (IDE) standard, or other suitable standards. The connection interface unit 402 and the memory control circuit unit 404 may be packaged in one chip, or the connection interface unit 402 may be arranged outside a chip containing the memory control circuit unit 404.

The memory control circuit unit 404 is configured to execute multiple logic gates or control commands implemented in the form of hardware or the form of firmware and perform operations such as writing, reading, and erasing data in the rewritable non-volatile memory module 406 according to the commands of the host system 11.

The rewritable non-volatile memory module 406 is coupled to the memory control circuit unit 404 and is configured to store data written by the host system 11. The rewritable non-volatile memory module 406 may be a single level cell (SLC) NAND flash memory module (that is, a flash memory module that may store 1 bit in a memory cell), a multi level cell (MLC) NAND flash memory module (that is, a flash memory module that may store 2 bits in a memory cell), a triple level cell (TLC) NAND flash memory module (that is, a flash memory module that may store 3 bits in a memory cell), a quad level cell (QLC) NAND flash memory module (that is, a flash memory module that may store 4 bits in a memory cell), other flash memory modules, or other memory modules with the same characteristics.

Each memory cell in the rewritable non-volatile memory module 406 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. This operation of changing the threshold voltage of the memory cell is also referred to as "writing data to the memory cell" or "programming the memory cell". As the threshold voltage changes, each memory cell in the rewritable non-volatile memory module 406 has multiple storage statuses. Through applying a read voltage, it is possible to determine which storage status a memory cell belongs to, thereby obtaining one or more bits stored in the memory cell.

In this exemplary embodiment, the memory cells of the rewritable non-volatile memory module 406 may constitute multiple physical programming units, and the physical programming units may constitute multiple physical erasing units. Specifically, the memory cells on the same word line may form one or more physical programming units. If each memory cell may store more than 2 bits, the physical programming units on the same word line may be classified into at least a lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit, and/or the reliability of the lower physical programming unit is higher than the reliability of the upper physical programming unit.

In this exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area contains multiple physical sectors for storing user data, and the redundancy bit area is configured to store system data (for example, management data such as an error correcting code). In this exemplary embodiment, the data bit area contains 32 physical sectors, and the size of one physical sector is 512 bytes (B). However, in other exemplary embodiments, the data bit area may also contain 8, 16, more, or less physical sectors, and the size of each physical sector may also be greater or smaller. On the other hand, the physical erasing unit is the smallest unit of erasure. That is, each physical erasing unit contains the smallest number of memory cells to be erased together. For example, the physical erasing unit is a physical block.

Figure 5:
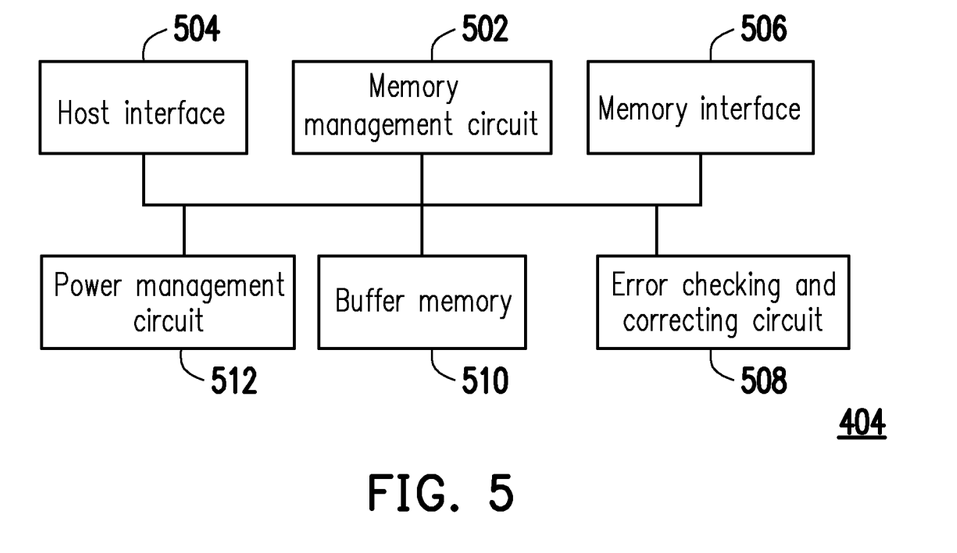
FIG. 5 is a schematic block diagram of a memory control circuit unit according to an exemplary embodiment of the disclosure.

FIG. 5 is a schematic block diagram of a memory control circuit unit according to an exemplary embodiment of the disclosure. Please refer to FIG. 5. The memory control circuit unit 404 includes a memory management circuit 502, a host interface 504, and a memory interface 506.

The memory management circuit 502 is configured to control the overall operation of the memory control circuit unit 404. Specifically, the memory management circuit 502 has multiple control commands, and the control commands are executed to perform operations such as writing, reading, and erasing data when the memory storage device 10 is operating. The following description of the operation of the memory management circuit 502 is equivalent to the description of the operation of the memory control circuit unit 404.

In this exemplary embodiment, the control commands of the memory management circuit 502 are implemented in the form of firmware. For example, the memory management circuit 502 has a microprocessor unit (not shown) and a read only memory (not shown), and the control commands are burnt to the read only memory. When the memory storage device 10 is operating, the control commands are executed by the microprocessor unit to perform operations such as writing, reading, and erasing data.

In another exemplary embodiment, the control commands of the memory management circuit 502 may also be stored in a specific area (for example, a system area dedicated to storing system data in a memory module) of the rewritable non-volatile memory module 406 in the form of program codes. In addition, the memory management circuit 502 has a microprocessor unit (not shown), a read only memory (not shown), and a random access memory (not shown). In particular, the read only memory has a boot code, and the microprocessor unit first executes the boot code to load the control commands stored in the rewritable non-volatile memory module 406 to the random access memory of the memory management circuit 502 when the memory control circuit unit 404 is enabled. After that, the microprocessor unit runs the control commands to perform operations such as writing, reading, and erasing data.

In addition, in another exemplary embodiment, the control commands of the memory management circuit 502 may also be implemented in the form of hardware. For example, the memory management circuit 502 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage a memory cell or a memory cell group of the rewritable non-volatile memory module 406. The memory write circuit is configured to issue a write command sequence to the rewritable non-volatile memory module 406 to write data to the rewritable non-volatile memory module 406. The memory read circuit is configured to issue a read command sequence to the rewritable non-volatile memory module 406 to read data from the rewritable non-volatile memory module 406. The memory erase circuit is configured to issue an erase command sequence to the rewritable non-volatile memory module 406 to erase data from the rewritable non-volatile memory module 406. The data processing circuit is configured to process data to be written to the rewritable non-volatile memory module 406 and data read from the rewritable non-volatile memory module 406. The write command sequence, the read command sequence, and the erase command sequence may each include one or more program codes or command codes and are configured to instruct the rewritable non-volatile memory module 406 to execute corresponding operations such as writing, reading, and erasing. In an exemplary embodiment, the memory management circuit 502 may also issue other types of command sequences to the rewritable non-volatile memory module 406 to instruct to execute corresponding operations.

The host interface 504 is coupled to the memory management circuit 502. The memory management circuit 502 may communicate with the host system 11 through the host interface 504. The host interface 504 may be configured to receive and identify commands and data transmitted by the host system 11. For example, the commands and the data transmitted by the host system 11 may be transmitted to the memory management circuit 502 through the host interface 504. In addition, the memory management circuit 502 may transmit the data to the host system 11 through the host interface 504. In this exemplary embodiment, the host interface 504 is compatible with the SATA standard. However, it must be understood that the disclosure is not limited thereto, and the host interface 504 may also be compatible with the PATA standard, the IEEE 1394 standard, the PCI express standard, the USB standard, the SD interface standard, the UHS-I interface standard, the UHS-II interface standard, the MS interface standard, the MMC interface standard, the eMMC interface standard, the UFS interface standard, the CF interface standard, the IDE standard, or other suitable data transmission standards.

The memory interface 506 is coupled to the memory management circuit 502 and is configured to access the rewritable non-volatile memory module 406. In other words, the data to be written to the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 will transmit corresponding command sequences. For example, the command sequences may include a write command sequence instructing to write data, a read command sequence instructing to read data, an erase command sequence instructing to erase data, and corresponding command sequences instructing various memory operations (for example, changing a read voltage level, executing a garbage collection operation, etc.). The command sequences are, for example, generated by the memory management circuit 502 and transmitted to the rewritable non-volatile memory module 406 through the memory interface 506. The command sequences may include one or more signals, or data on a bus. The signals or the data may include command codes or program codes. For example, the read command sequence includes information such as a read recognition code and a memory address.

In an exemplary embodiment, the memory control circuit unit 404 further includes an error detecting and correcting circuit 508, a buffer memory 510, and a power management circuit 512. The error detecting and correcting circuit 508 is coupled to the memory management circuit 502 and is configured to execute error detecting and correcting operations to ensure the correctness of data. Specifically, when the memory management circuit 502 receives a write command from the host system 11, the error detecting and correcting circuit 508 generates a corresponding error correcting code (ECC) and/or error detecting code (EDC) for data corresponding to the write command, and the memory management circuit 502 writes the data corresponding to the write command and the corresponding ECC and/or EDC to the rewritable non-volatile memory module 406. Later, when the memory management circuit 502 reads the data from the rewritable non-volatile memory module 406, the ECC and/or the EDC corresponding to the data will also be simultaneously read, and the error detecting and correcting circuit 508 will execute the error checking and correcting operations on the read data according to the ECC and/or the EDC.

The buffer memory 510 is coupled to the memory management circuit 502 and is configured to temporarily store data and commands from the host system 11 or data from the rewritable non-volatile memory module 406. The power management circuit 512 is coupled to the memory management circuit 502 and is configured to control the power of the memory storage device 10.

In an exemplary embodiment, the rewritable non-volatile memory module 406 of FIG. 4 is also referred to as a flash memory module, the memory control circuit unit 404 is also referred to as a flash memory controller for controlling the flash memory module, and/or the memory management circuit 502 of FIG. 5 is also referred to as a flash memory management circuit.

Figure 6:
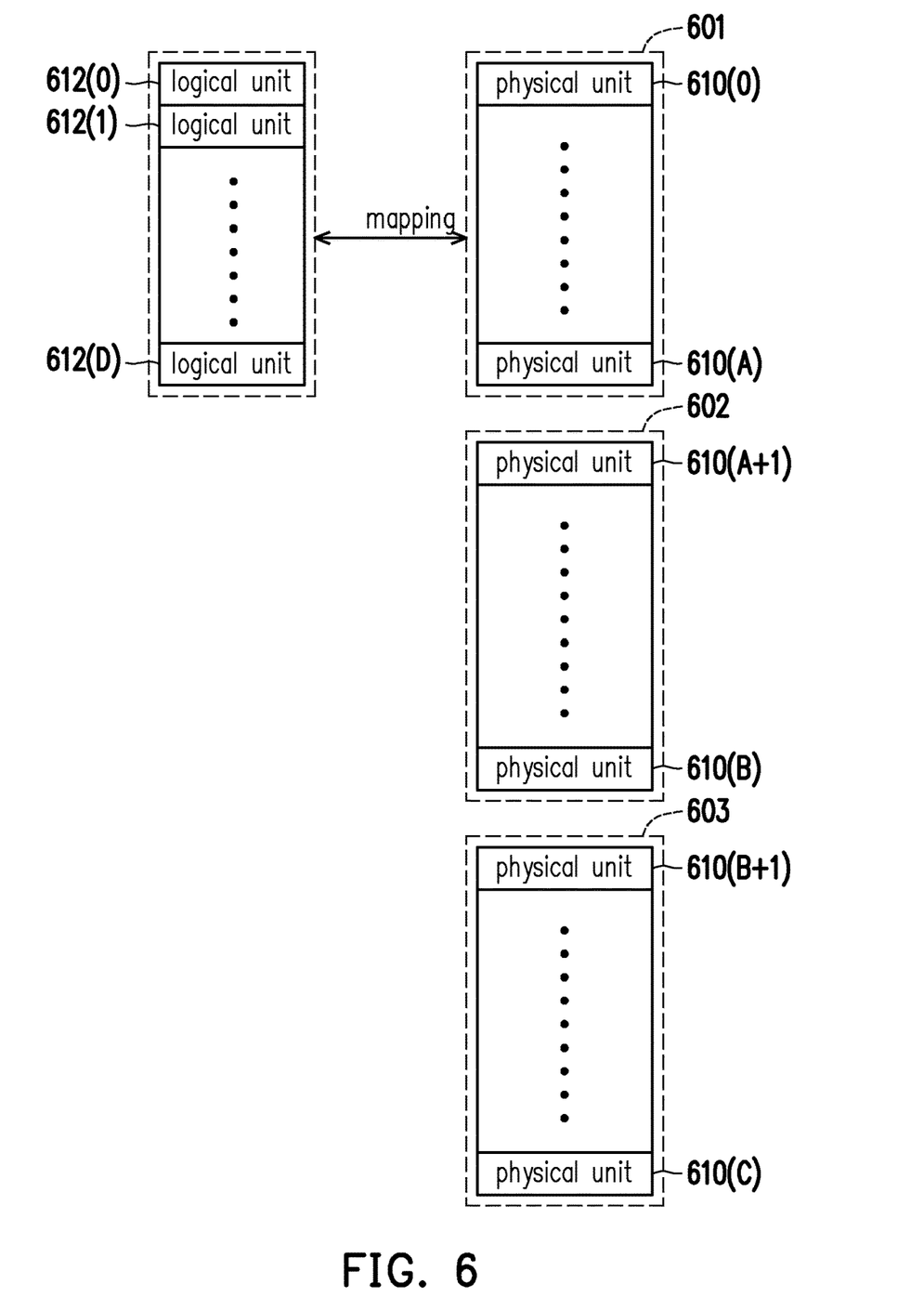
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Please refer to FIG. 6. The memory management circuit 502 may logically group physical units 610(0) to 610(C) of the rewritable non-volatile memory module 406 to a storage area 601, a spare area 602, and a system area 603. Data is stored in the physical units 610(0) to 610(A) in the storage area 601. For example, valid data and invalid data may be stored in the physical units 610(0) to 610(A) in the storage area 601. The physical units 610(A+1) to 610(B) in the spare area 602 are not yet configured to store data (for example, valid data). The physical units 610(B+1) to 610(C) in the system area 603 are configured to store system data, such as a logical-to-physical mapping table, a bad block management table, a device model, or other types of management data.

In an exemplary embodiment, a physical unit is also referred to as a virtual block (VB). One physical unit may contain one or more physical blocks. When data is to be stored, the memory management circuit 502 may select at least one physical unit from the physical units 610(A+1) to 610(B) of the spare area 602 and store data from the host system 11 or from at least one physical unit in the storage area 601 to the selected physical unit. At the same time, the selected physical unit is associated to the storage area 601. In addition, an erased physical unit may be re-associated to the spare area 602.

In an exemplary embodiment, the memory management circuit 502 may be configured with logical units 612(0) to 612(D) to map the physical units 610(0) to 610(A) in the storage area 601. One logical unit may contain one or more logical addresses. For example, the logical address may be a logical block address (LBA). Each of the logical units 612(0) to 612(D) may be mapped to one or more physical units. It should be noted that the memory management circuit 502 may not be configured with logical units mapped to the system area 603 to prevent management data stored in the system area 603 from being modified by the user.

In an exemplary embodiment, the memory management circuit 502 may record a mapping relationship (also referred to as logical-to-physical mapping information or mapping information) between the logical units and the physical units in at least one logical-to-physical mapping table. The logical-to-physical mapping table is stored in the physical units 610(B+1) to 610(C) of the system area 603. When the host system 11 intends to read data from the memory storage device 10 or write data to the memory storage device 10, the memory management circuit 502 may execute a data access operation on the memory storage device 10 according to the logical-to-physical mapping table.

It should be noted that the valid data is the newest data belonging to a certain logical unit, while the invalid data is not the newest data belonging to any logical unit. For example, if the host system 11 stores a piece of new data to a certain logical unit to overwrite old data originally stored in the logical unit (that is, updates the data belonging to the logical unit), the piece of new data stored in the storage area 601 is the newest data belonging to the logical unit and will be marked as valid, while the overwritten old data may still be stored in the storage area 601 but marked as invalid.

In an exemplary embodiment, if the data belonging to a certain logical unit is updated, the mapping relationship between the logical unit and the physical unit stored with old data belonging to the logical unit will be removed, and the mapping relationship between the logical unit and the physical unit stored with the newest data belonging to the logical unit will be established. However, in another exemplary embodiment, if the data belonging to a certain logical unit is updated, the mapping relationship between the logical unit and the physical unit stored with the old data belonging to the logical unit may still be maintained.

In an exemplary embodiment, when the memory storage device 10 is shipped from the factory, the total number of physical units belonging to the spare area 602 is a preset number (for example, 30). During the operation of the memory storage device 10, more and more physical units will be selected from the spare area 602 and associated to the storage area 601 to store data (for example, user data from the host system 11). Therefore, the total number of physical units belonging to the spare area 602 will gradually decrease as the memory storage device 10 is used.

In an exemplary embodiment, during the operation of the memory storage device 10, the memory management circuit 502 may continuously update the total number of physical units belonging to the spare area 602. The memory management circuit 502 may execute a data consolidation operation according to the number of physical units in the spare area 602 (that is, the total number of spare management units). For example, the memory management circuit 502 may determine whether the total number of physical units belonging to the spare area 602 is less than or equal to a threshold value (also referred to as a first threshold value). The first threshold value is, for example, a value of 2 or more (for example, 10), which is not limited by the disclosure. If the total number of physical units belonging to the spare area 602 is less than or equal to the first threshold value, the memory management circuit 502 may execute the data consolidation operation. In an exemplary embodiment, the data consolidation operation is also referred to as the garbage collection operation.

In an exemplary embodiment, during the data consolidation operation, the memory management circuit 502 may select at least one physical unit from the storage area 601 as a source physical unit and select at least one physical unit from the spare area 602 as a target physical unit. The memory management circuit 502 may transmit at least one command sequence to instruct the rewritable non-volatile memory module 406 to copy the valid data from the physical unit as the source physical unit to the physical unit as the target physical unit. The physical unit as the target physical unit filled with the valid data may be associated to the storage area 601. If the valid data stored in a certain management unit have all been copied to the target physical unit, the physical unit may be erased and associated to the spare area 602.

In an exemplary embodiment, the operation of re-associating a certain physical unit from the storage area 601 back to the spare area 602 (or the operation of erasing a certain physical unit) is also referred to as releasing a spare management unit. By executing the data consolidation operation, one or more spare physical units will be released, so that the total number of physical units belonging to the spare area 602 will gradually increase.

In an exemplary embodiment, after starting to execute the data consolidation operation, if the physical units belonging to the spare area 602 meet a specific condition, the data consolidation operation may be stopped. For example, the memory management circuit 502 may determine whether the total number of physical units belonging to the spare area 602 is greater than or equal to a threshold value (hereinafter also referred to as a second threshold value). For example, the second threshold may be greater than or equal to the first threshold value. If the total number of physical units belonging to the spare area 602 is greater than or equal to the second threshold value, the memory management circuit 502 may stop the data consolidation operation. It should be noted that stopping the data consolidation operation refers to ending the currently executed data consolidation operation. After stopping one data consolidation operation, if the total number of physical units belonging to the spare area 602 is less than or equal to the first threshold value again, the next data consolidation operation may be executed again to try to release a new spare physical unit.

In an exemplary embodiment, the memory management circuit 502 may store specific management information (also referred to as first management information) in the rewritable non-volatile memory module 406. For example, the first management information may be stored in one or more physical units in the system area 603. In particular, the first management information may reflect a storage status of abnormal data in a certain physical unit (also referred to as the first physical unit) in the storage area 601. For example, the first management information may reflect whether the abnormal data exists in the first physical unit and/or the distribution of the abnormal data in the first physical unit.

In an exemplary embodiment, the abnormal data may include corrupted data and/or uncorrectable data. For example, before reading a certain data, if it is known that the data content of the data is corrupted and/or cannot be successfully decoded, the data may be regarded as corrupted data. In addition, before reading a certain data, if it is unknown whether the data content of the data is corrupted, and it is found that the data cannot be successfully decoded only after the data is read and decoded, the data that cannot be successfully decoded may be regarded as uncorrectable data.

In an exemplary embodiment, the memory management circuit 502 may receive a read command from the host system 11. The read command may instruct to read data stored in at least one logical unit. The at least one logical unit corresponds to at least one physical node in the first physical unit. In an exemplary embodiment, it may be regarded that the at least one physical node in the first physical unit is mapped by the at least one logical unit.

In an exemplary embodiment, the memory management circuit 502 may inquire the first management information according to the read command. If an inquiring result reflects that the abnormal data is not stored in the at least one physical node, the memory management circuit 502 may instruct the rewritable non-volatile memory module 406 to read the data required by the host system 11 from the at least one physical node and transmit the data read from the at least one physical node to the host system 11 in response to the read command. It should be noted that the operation of reading the data required by the host system 11 from the at least one physical node may include decoding the data to correct errors therein. On the other hand, if the inquiring result reflects that the abnormal data is stored in the at least one physical node, the memory management circuit 502 may transmit error information to the host system 11. The error information may inform the host system 11 that the data required thereby belongs to the abnormal data (or the uncorrectable data).

In an exemplary embodiment, if the data instructed by the read command is moved in the memory storage device 10 (for example, moved to the first physical unit via the data consolidation operation), the data may be regarded as normal data to be stored in the first physical unit regardless of whether the data belongs to the abnormal data. Later, when the host system 11 tries to read the data (which is actually the abnormal data) via the read command, the memory management circuit 502 may regard the data as the normal data to be read from the first physical unit and transmitted to the host system 11. At this time, the host system 11 or the user thereof may find that the data quality of the data from the memory storage device 10 is problematic, thereby reducing the user experience.

In an exemplary embodiment, regardless of whether the data instructed to be read by the read command has been moved, by inquiring the first management information, whether the data instructed to be read by the read command contains relevant information of the abnormal data may be obtained. Once the data instructed to be read by the read command contains the abnormal data, the error information may be transmitted to the host system 11 as replacement. In this way, the probability of accidentally transmitting the abnormal data to the host system 11 may be effectively reduced, thereby improving the data access quality.

In an exemplary embodiment, the first management information includes unit management information. The unit management information may reflect whether the abnormal data is stored in the first physical unit. In other words, after inquiring the unit management information, the memory management circuit 502 may obtain relevant information of whether the abnormal data is stored in the first physical unit.

In an exemplary embodiment, the first management information further includes node management information. The node management information may reflect whether the abnormal data is stored in the at least one physical node. In other words, after inquiring the node management information, the memory management circuit 502 may obtain relevant information of whether the abnormal data is stored in the at least one physical node in the first physical unit.

In an exemplary embodiment, the unit management information may also reflect a storage address of the node management information in the first management information in the rewritable non-volatile memory module 406. Therefore, in an exemplary embodiment, after inquiring the unit management information, the memory management circuit 502 may also obtain the storage address of the node management information in the first management information in the rewritable non-volatile memory module 406, so as to read the required node management information from the storage address.

Figure 7:
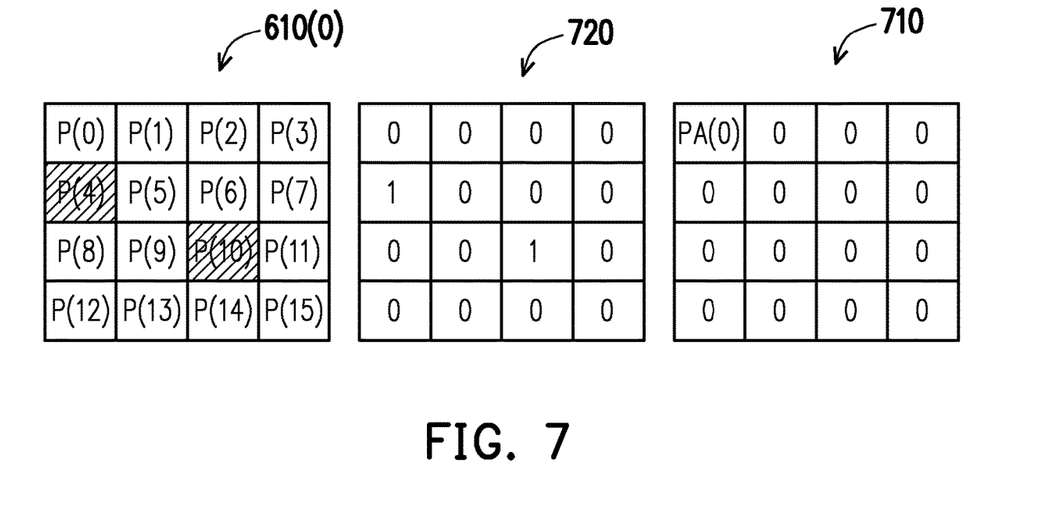
FIG. 7 is a schematic diagram of a first physical unit and first management information according to an exemplary embodiment of the disclosure.

FIG. 7 is a schematic diagram of a first physical unit and first management information according to an exemplary embodiment of the disclosure. Please refer to FIG. 7. In an exemplary embodiment, the physical unit 610(0) is used as an example of the first physical unit. However, in another exemplary embodiment, the first physical unit may also refer to other physical units in the rewritable non-volatile memory module 406, which is not limited by the disclosure.

In an exemplary embodiment, it is assumed that the physical unit 610(0) (that is, the first physical unit) contains physical nodes P(0) to P(15). The physical nodes P(0) to P(15) may be configured to store data. For example, each of the physical nodes P(0) to P(15) may be configured to store 4 KB or other sizes of data.

In an exemplary embodiment, after receiving the read command, the data instructed to be read in response to the read command is stored in the physical unit 610(0), the memory management circuit 502 may inquire the first management information to know whether the abnormal data is stored in the physical unit 610(0) and/or a distribution state of the abnormal data in the physical unit 610(0).

In an exemplary embodiment, the first management information includes unit management information 710 and node management information 720. The unit management information 710 may include a bit mapping table, as shown in FIG. 7. For example, information in each storage field in the bit mapping table may reflect whether the abnormal data is stored in a certain corresponding physical unit. Alternatively, the bit mapping table may also reflect the distribution state of the abnormal data in multiple physical units. For example, if the information in a certain storage field in the unit management information 710 is the value "0" (or a certain preset value), it means that the abnormal data is not stored in the physical unit corresponding to the storage field. Conversely, if the information in a certain storage field in the unit management information 710 is not the value "0" (or a certain preset value), it means that the abnormal data is stored in the physical unit corresponding to the storage field.

Taking FIG. 7 as an example, in an exemplary embodiment, it is assumed that (only) the information in the storage field corresponding to the physical unit 610(0) in the unit management information 710 is not the value "0" (or other meaningless values). Therefore, the memory management circuit 502 may judge that the abnormal data is (only) stored in the physical unit 610(0) according to the information in the unit management information 710.

In an exemplary embodiment, the information in the storage field corresponding to the physical unit 610(0) in the unit management information 710 may include address information PA(0). The address information PA(0) may reflect a storage address of the node management information 720 corresponding to the physical unit 610(0) in the system area 603 of FIG. 6. Therefore, in an exemplary embodiment, after inquiring the unit management information 710, the memory management circuit 502 may also instruct the rewritable non-volatile memory module 406 to read the node management information 720 from the storage address reflected by the address information PA(0).

Figure 8:
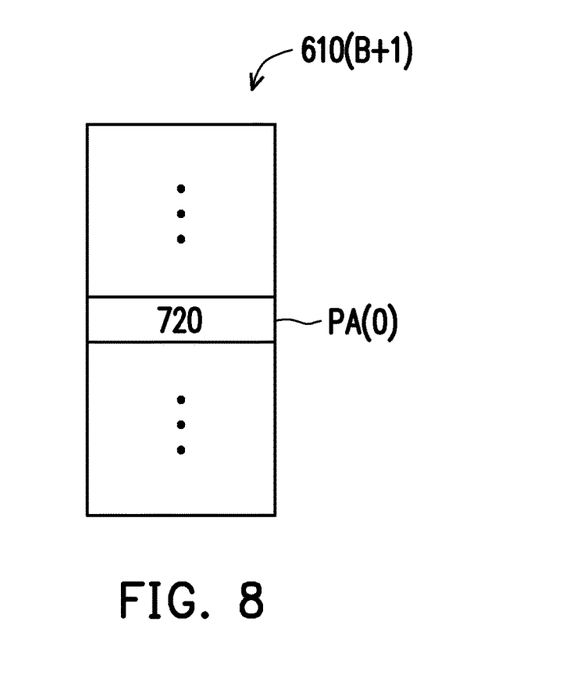
FIG. 8 is a schematic diagram of node management information stored in a system area according to an exemplary embodiment of the disclosure.

FIG. 8 is a schematic diagram of node management information stored in a system area according to an exemplary embodiment of the disclosure. Please refer to FIG. 8. In an exemplary embodiment, it is assumed that the node management information 720 is stored in the physical unit 610(B+1) in the system area 603 of FIG. 6. The memory management circuit 502 may read the node management information 720 from the storage address reflected by the address information PA(0). Thereafter, the memory management circuit 502 may know the distribution state of the abnormal data in the physical unit 610(0) according to the node management information 720.

Returning to FIG. 7, in an exemplary embodiment, the node management information 720 may also include the bit mapping table, as shown in FIG. 7. The bit mapping table may reflect the distribution state of the abnormal data in the physical nodes P(0) to P(15) of the physical unit 610(0). For example, the information in each storage field in the bit mapping table may reflect whether the abnormal data is stored in a certain corresponding physical node. For example, if the information in a certain storage field in the node management information 720 is the value "0" (or a certain preset value), it means that the abnormal data is not stored in the physical node corresponding to the storage field. Conversely, if the information in a certain storage field in the node management information 720 is the value "1" (or another preset value), it means that the abnormal data is stored in the physical node corresponding to the storage field.

Taking FIG. 7 as an example, in an exemplary embodiment, it is assumed that (only) the information in the storage fields corresponding to the physical nodes P(4) and P(10) in the node management information 720 are the value "1". Therefore, the memory management circuit 502 may judge that the abnormal data is (only) stored in the physical nodes P(4) and P(10) in the physical unit 610(0) according to the information in the node management information 720.

In an exemplary embodiment, it is assumed that the read command instructs to read data stored in the physical nodes P(4) and/or P(10). According to the unit management information 710 and the node management information 720, the memory management circuit 502 may not read data from the physical nodes P(4) and/or P(10) in response to the read command. On the contrary, the memory management circuit 502 may transmit the error information to the host system 11 to inform the host system 11 that the data stored in the physical nodes P(4) and/or P(10) belong to the abnormal data. Thereafter, the host system 11 may decide by itself whether to update the data of the logical units corresponding to the physical nodes P(4) and/or P(10) or execute other error handling operations.

In an exemplary embodiment, it is assumed that the read command instructs to read data stored in the remaining physical nodes P(1) to P(3), P(5) to P(9), and/or P(11) to P(15) in the physical unit 610(0). The memory management circuit 502 may instruct the rewritable non-volatile memory module 406 to normally read the data from the physical nodes according to the unit management information 710 and the node management information 720 and transmit the read data to the host system 11 in response to the read command.

In an exemplary embodiment, before receiving the read command, the memory management circuit 502 may execute the data consolidation operation to copy specific data (that is, valid data) from another physical unit (also referred to as the second physical unit) in the storage area 601 of FIG. 6 to the first physical unit. On the other hand, in response to the data consolidation operation, the memory management circuit 502 may update the first management information according to another management information (also referred to as second management information). In particular, the second management information may reflect a storage status of the abnormal data in the second physical unit. For example, the second management information may reflect whether the abnormal data exists in the second physical unit and/or a distribution state of the abnormal data in the second physical unit.

Figure 9:
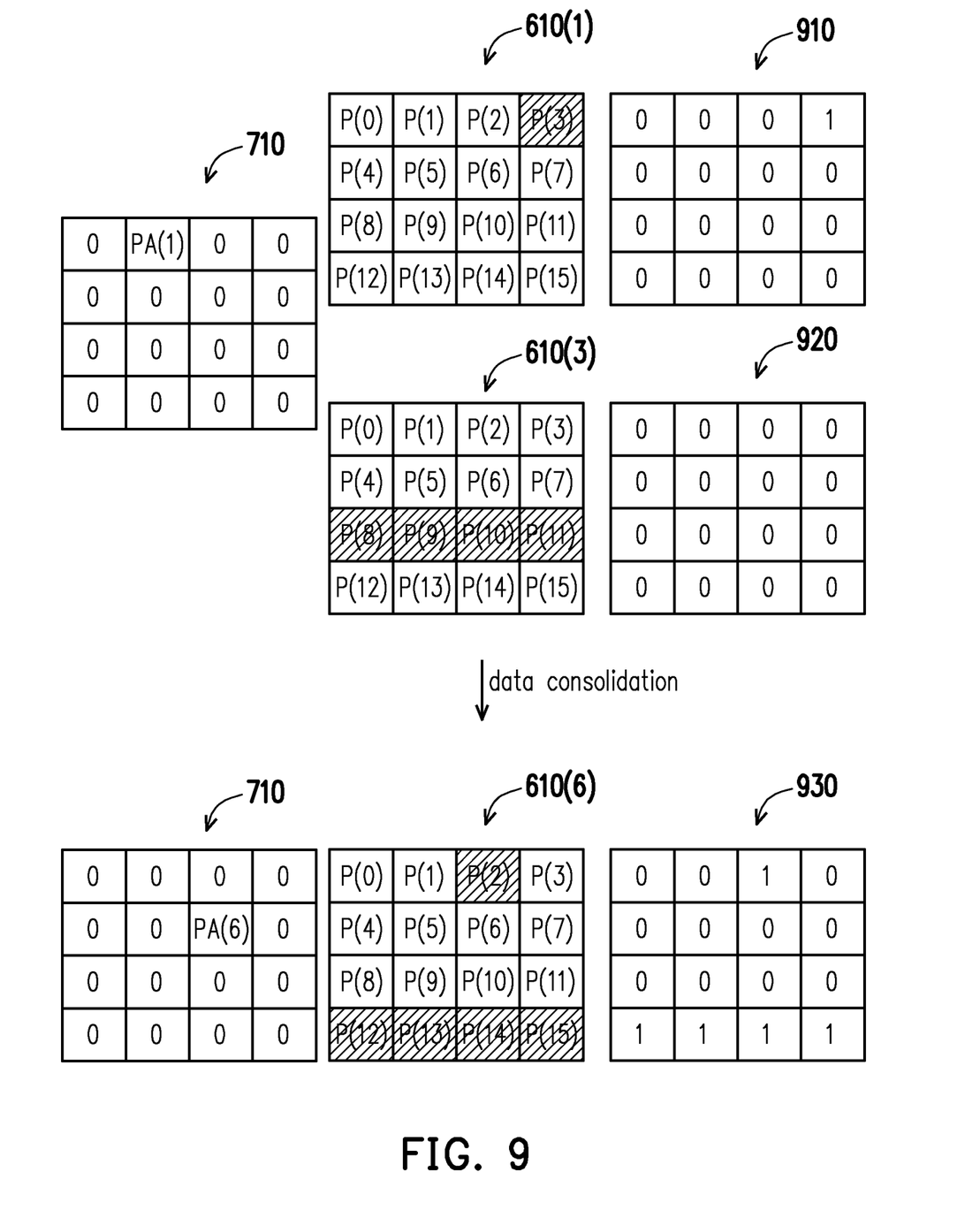
FIG. 9 is a schematic diagram of updating first management information in response to a data consolidation operation according to an exemplary embodiment of the disclosure.

FIG. 9 is a schematic diagram of updating first management information in response to a data consolidation operation according to an exemplary embodiment of the disclosure. Referring to FIG. 9, in an exemplary embodiment, the physical unit 610(6) is used as an example of the first physical unit, and the physical units 610(1) and 610(3) are used as examples of the second physical units.

In an exemplary embodiment, it is assumed that node management information 910 corresponds to the physical unit 610(1) and node management information 920 corresponds to the physical unit 610(3). The node management information 910 may reflect the distribution state of the abnormal data in the physical unit 610(1). The node management information 920 may reflect the distribution state of the abnormal data in the physical unit 610(3). In addition, the unit management information 710 may reflect that the abnormal data is stored in the physical unit 610(1), and the address information PA(1) in the unit management information 710 may reflect a storage address of the node management information 910 in the rewritable non-volatile memory module 406.

It should be noted that in the exemplary embodiment of FIG. 9, it is assumed that the data stored before starting the data consolidation operation, the data stored in the physical node P(3) of the physical unit 610(1) is known uncorrectable data (that is, corrupted data), and the data stored in the physical nodes P(8) to P(11) of the physical unit 610(3) are unknown uncorrectable data. Therefore, before starting the data consolidation operation, the node management information 910 may reflect that the abnormal data is stored in the physical node P(3) of the physical unit 610(1). However, the node management information 920 (and the unit management information 710) does not reflect that any abnormal data is stored in the physical unit 610(3).

In an exemplary embodiment, during the data consolidation operation, the memory management circuit 502 may select the physical units 610(1) and 610(3) as the source physical units and the physical unit 610(6) as the target physical unit. The memory management circuit 502 may collect valid data from the physical units 610(1) and 610(3) and copy the collected valid data to the physical unit 610(6).

In response to the data consolidation operation, the memory management circuit 502 may update the unit management information 710 and the node management information 930 corresponding to the physical unit 610(6). For example, the updated unit management information 710 may reflect that the abnormal data is stored in the physical unit 610(6). For example, the updated unit management information 710 may reflect the storage address of the node management information 930 in the rewritable non-volatile memory module 406 via address information PA(6). In addition, the node management information 930 may reflect that the data in the physical nodes P(2) and P(12) to P(15) of the physical unit 610(6) belong to the abnormal data.

In an exemplary embodiment, if the valid data moved during the data consolidation operation contains the abnormal data originally stored in the physical node P(3) of the physical unit 610(1), the memory management circuit 502 may update the node management information 930 according to information reflecting the distribution of the abnormal data in the node management information 910.

Taking FIG. 9 as an example, it is assumed that the data originally stored in the physical node P(3) of the physical unit 610(1) is stored to the physical node P(2) of the physical unit 610(6) via the data consolidation operation. In this example, the updated node management information 930 may reflect that the data in the physical node P(2) of the physical unit 610(6) (that is, the data originally stored in the physical node P(3) of the physical unit 610(1)) is the abnormal data.

In an exemplary embodiment, during the data consolidation operation, the data (that is, the valid data) read from the physical nodes P(8) to P(11) of the physical unit 610(3) may be tried to be decoded (for example, decoded by the error detecting and correcting circuit 508), but cannot be successfully decoded. Therefore, during the data consolidation operation, the memory management circuit 502 may judge that the data read from the physical nodes P(8) to P(11) of the physical unit 610(3) is the abnormal data. Thereafter, assuming that the data read from the physical nodes P(8) to P(11) of the physical unit 610(3) are stored to the physical nodes P(12) to P(15) of the physical unit 610(6), the memory management circuit 502 may correspondingly update the node management information 930. The updated node management information 93 may reflect that the data stored in the physical nodes P(12) to P(15) of the physical unit 610(6) via the data consolidation operation belongs to the abnormal data.

In an exemplary embodiment, after the valid data is copied from the second physical unit to the first physical unit, the second management information corresponding to the second physical unit may be reset. Taking FIG. 9 as an example, after completely moving or copying the valid data from the physical units 610(1) and 610(3) to the physical unit 610(6), the data in the physical units 610(1) and 610(3) may all be marked as invalid. In response to the data in the physical units 610(1) and 610(3) being all marked as invalid, the node management information 910 and 920 may be reset (for example, cleared). At the same time, mark information (or description information) previously relevant to the physical units 610(1) and 610(3) in the updated unit management information 710 may also be reset (for example, cleared).

Figure 10:
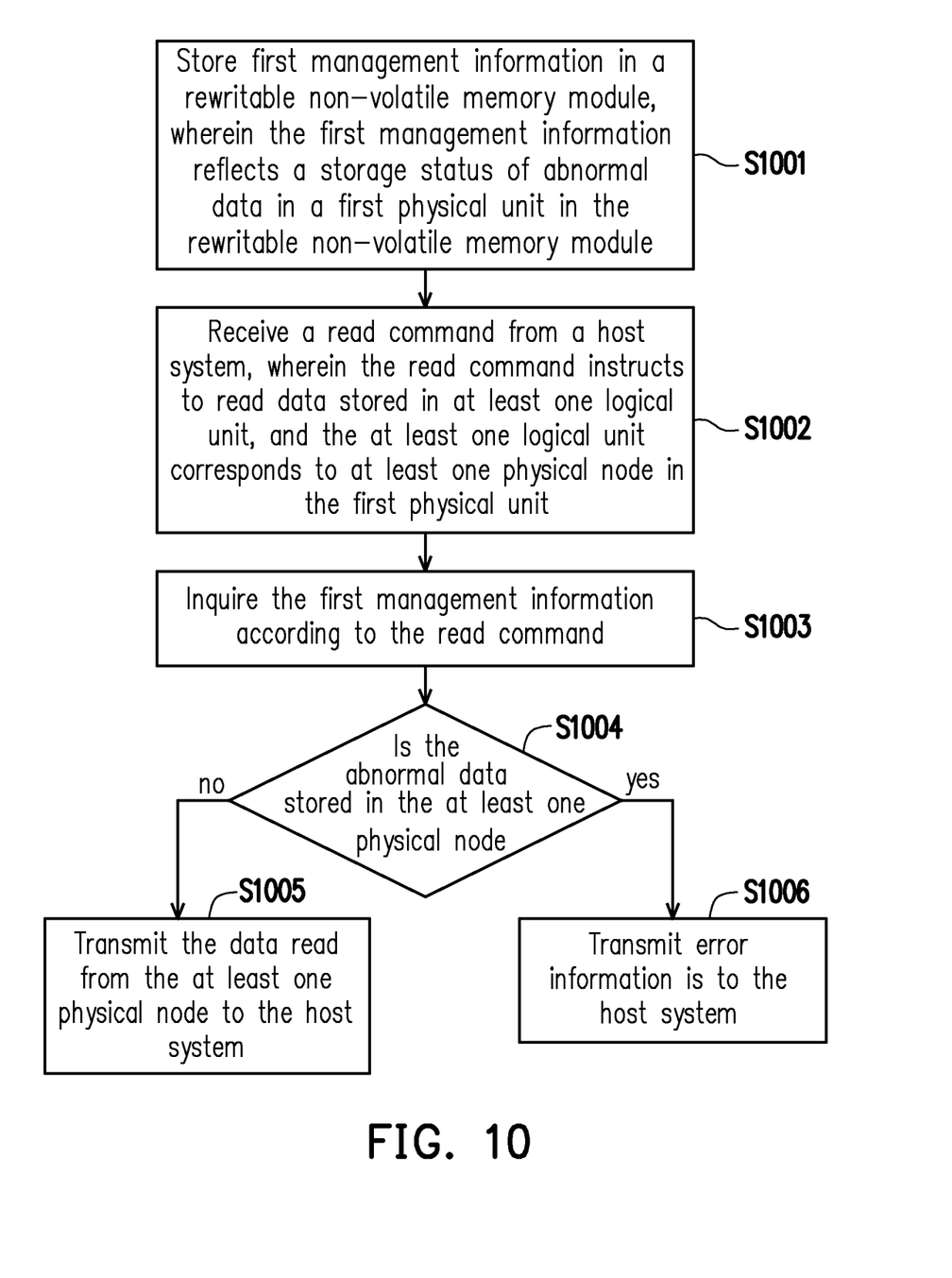
FIG. 10 is a flowchart of a memory management method according to an exemplary embodiment of the disclosure.

FIG. 10 is a flowchart of a memory management method according to an exemplary embodiment of the disclosure. Please refer to FIG. 10. In Step S1001, first management information is stored in a rewritable non-volatile memory module. The first management information reflects a storage status of abnormal data in a first physical unit in the rewritable non-volatile memory module. In Step S1002, a read command is received from a host system. The read command instructs to read data stored in at least one logical unit. The at least one logical unit corresponds to at least one physical node in the first physical unit. In Step S1003, the first management information is inquired according to the read command. In Step S1004, whether the abnormal data is stored in the at least one physical node is determined according to an inquiring result.

If the inquiring result reflects that the abnormal data is not stored in the at least one physical node, in Step S1005, the data read from the at least one physical node is transmitted to the host system. However, if the inquiring result reflects that the abnormal data is stored in the at least one physical node, in Step S1006, error information is transmitted to the host system. The error information may reflect that the data read by the read command is the abnormal data.

However, each step in FIG. 10 has been described in detail as above and will not be repeated here. It is worth noting that each step in FIG. 10 may be implemented as multiple program codes or circuits, which is not limited by the disclosure. In addition, the method in FIG. 10 may be used in conjunction with the above exemplary embodiments or may be used alone, which is not limited by the disclosure.

In summary, the first management information may be configured to continuously manage the storage status (and/or the distribution state) of the abnormal data in the at least one physical unit in the rewritable non-volatile memory module. In addition, by continuously updating the first management information, even if a certain abnormal data is moved via at least one data consolidation operation, the updated first management information may continue to locate or lock the final storage address of the abnormal data. When the data read by the host system is the abnormal data, the error information may replace the abnormal data to be transmitted to the host system, thereby reducing the probability of the host system reading the corrupted data or the uncorrectable data. In this way, the data access quality of the memory storage device can be effectively improved.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be determined by the scope of the appended claims.

What is claimed is:

1. A memory management method, applicable to a rewritable non-volatile memory module, wherein the rewritable non-volatile memory module comprises a plurality of physical units, the memory management method comprising:
   executing a data consolidation operation to copy abnormal data from a second physical unit among the plurality of physical units to a first physical unit among the plurality of physical units;
   storing first management information in the rewritable non-volatile memory module and updating the first management information according to second management information, wherein the first management information reflects a storage status of the abnormal data in the first physical unit, and the second management information reflects a storage status of the abnormal data in the second physical unit;
   receiving a read command from a host system, wherein the read command instructs to read data stored in at least one logical unit, and the at least one logical unit corresponds to at least one physical node in the first physical unit;
   inquiring the first management information according to the read command;
   transmitting data read from the at least one physical node to the host system when an inquiring result reflects that the abnormal data is not stored in the at least one physical node; and
   transmitting error information to the host system when the inquiring result reflects that the abnormal data is stored in the at least one physical node.

2. The memory management method according to claim 1, wherein the abnormal data comprises at least one of corrupted data and uncorrectable data.

3. The memory management method according to claim 1, wherein the first management information comprises unit management information, which reflects whether the abnormal data is stored in the first physical unit.

4. The memory management method according to claim 3, wherein the first management information further comprises node management information, which reflects whether the abnormal data is stored in the at least one physical node.

5. The memory management method according to claim 4, wherein the step of inquiring the first management information according to the read command comprises:
   obtaining a storage address of the node management information in the rewritable non-volatile memory module according to the unit management information; and
   reading the node management information from the storage address.

6. The memory management method according to claim 1, further comprising:
   resetting the second management information after copying the abnormal data from the second physical unit to the first physical unit.

7. A memory storage device, comprising:
   a connection interface unit, configured to couple to a host system;
   a rewritable non-volatile memory module, comprising a plurality of physical units; and
   a memory control circuit unit, coupled to the connection interface unit and the rewritable non-volatile memory module, wherein
   the memory control circuit unit is configured to execute a data consolidation operation to copy abnormal data from a second physical unit among the plurality of physical units to a first physical unit among the plurality of physical units,
   the memory control circuit unit is further configured to store first management information in the rewritable non-volatile memory module and update the first management information according to second management information, wherein the first management information reflects a storage status of the abnormal data in the first physical unit, and the second management information reflects a storage status of the abnormal data in the second physical unit,
   the memory control circuit unit is further configured to receive a read command from the host system, wherein the read command instructs to read data stored in at least one logical unit, and the at least one logical unit corresponds to at least one physical node in the first physical unit, the memory control circuit unit is further configured to inquire the first management information according to the read command, the memory control circuit unit is further configured to transmit data read from the at least one physical node to the host system when an inquiring result reflects that the abnormal data is not stored in the at least one physical node, and the memory control circuit unit is further configured to transmit error information to the host system when the inquiring result reflects that the abnormal data is stored in the at least one physical node.

8. The memory storage device according to claim 7, wherein the abnormal data comprises at least one of corrupted data and uncorrectable data.

9. The memory storage device according to claim 7, wherein the first management information comprises unit management information, which reflects whether the abnormal data is stored in the first physical unit.

10. The memory storage device according to claim 9, wherein the first management information further comprises node management information, which reflects whether the abnormal data is stored in the at least one physical node.

11. The memory storage device according to claim 10, wherein the operation of inquiring the first management information according to the read command comprises:

obtaining a storage address of the node management information in the rewritable non-volatile memory module according to the unit management information; and reading the node management information from the storage address.

12. The memory storage device according to claim 7, wherein the memory control circuit unit is further configured to reset the second management information after copying the abnormal data from the second physical unit to the first physical unit.

13. A memory control circuit unit, configured to control a rewritable non-volatile memory module, wherein the rewritable non-volatile memory module comprises a plurality of physical units, the memory control circuit unit comprising:

a host interface, configured to couple to a host system;

a memory interface, configured to couple to the rewritable non-volatile memory module; and a memory management circuit, coupled to the host interface and the memory interface, wherein the memory management circuit is configured to execute a data consolidation operation to copy abnormal data from a second physical unit among the plurality of physical units to a first physical unit among the plurality of physical units, the memory management circuit is further configured to store first management information in the rewritable non-volatile memory module and update the first management information according to second management information, wherein the first management information reflects a storage status of the abnormal data in the first physical unit, and the second management information reflects a storage status of the abnormal data in the second physical unit, the memory management circuit is further configured to receive a read command from the host system, wherein the read command instructs to read data stored in at least one logical unit, and the at least one logical unit corresponds to at least one physical node in the first physical unit, the memory management circuit is further configured to inquire the first management information according to the read command, the memory management circuit is further configured to transmit data read from the at least one physical node to the host system when an inquiring result reflects that the abnormal data is not stored in the at least one physical node, and the memory management circuit is further configured to transmit error information to the host system when the inquiring result reflects that the abnormal data is stored in the at least one physical node.

14. The memory control circuit unit according to claim 13, wherein the abnormal data comprises at least one of corrupted data and uncorrectable data.

15. The memory control circuit unit according to claim 13, wherein the first management information comprises unit management information, which reflects whether the abnormal data is stored in the first physical unit.

16. The memory control circuit unit according to claim 15, wherein the first management information further comprises node management information, which reflects whether the abnormal data is stored in the at least one physical node.

17. The memory control circuit unit according to claim 16, wherein the operation of inquiring the first management information according to the read command comprises:

obtaining a storage address of the node management information in the rewritable non-volatile memory module according to the unit management information; and reading the node management information from the storage address.

18. The memory control circuit unit according to claim 13, wherein the memory management circuit is further configured to reset the second management information after copying the abnormal data from the second physical unit to the first physical unit.

* * * * *